United States Patent [19]

Morimoto

[11] Patent Number: 6,125,213
[45] Date of Patent: Sep. 26, 2000

[54] IMAGE PROCESSING METHOD, AN IMAGE PROCESSING APPARATUS, AND A STORAGE MEDIUM READABLE BY A COMPUTER

[75] Inventor: Yasushi Morimoto, Yokohama, Japan

[73] Assignee: Canon Kabushiki Kaisha, Tokyo, Japan

[21] Appl. No.: 09/024,273

[22] Filed: Feb. 17, 1998

[30] Foreign Application Priority Data

Feb. 17, 1997 [JP] Japan ..................................... 9-032366
Feb. 19, 1997 [JP] Japan ..................................... 9-035090

[51] Int. Cl.$^7$ ..................................................... G06K 9/40
[52] U.S. Cl. ........................... 382/263; 382/275; 382/270
[58] Field of Search .................................... 382/260, 263, 382/275, 254, 190, 195, 199, 141, 261, 264, 270; 358/463, 466

[56] References Cited

U.S. PATENT DOCUMENTS

| | | | |
|---|---|---|---|
| 4,499,493 | 2/1985 | Nishimura | 382/263 |
| 4,747,156 | 5/1988 | Wahl | 382/275 |
| 5,214,470 | 5/1993 | Denber | 382/275 |
| 5,436,979 | 7/1995 | Gray et al. | 382/141 |
| 5,589,887 | 12/1996 | Wischermann | 382/275 |
| 5,974,194 | 10/1999 | Hirani et al. | 358/463 |
| 6,055,340 | 4/2000 | Nagao | 382/261 |

*Primary Examiner*—Scott Rogers
*Attorney, Agent, or Firm*—Fitzpatrick, Cella, Harper & Scinto

[57] ABSTRACT

An image processing method comprises the steps of setting a trash image candidate by defining the set of locations of the quadratic differential value of the lightness component of pixel signals, which changes from the value exceeding a positive first threshold value to the value less than a negative second threshold value for the adjacent pixels in a digital image, as the contours of such trash image candidate, extracting the trash area by defining it from among the trash area candidates having the changes of lightness components and saturation components between inner adjacent pixels within a specific range, and interpolating the pixel signals in the trash area in order of larger pixel numbers having effective pixels by use of the signals of effective circumferential pixels. Here, the pixels whose interpolation has been executed are used as new effective pixels, thus making it possible to interpolate the pixels in the trash area from the outer side to the inner side one after another. For the pixels having the same numbers of the adjacently effective pixels, the pixels are interpolated after obtaining only interpolated values of all of them. Hence, the trash images are removed for image correction effectively without deteriorating the quality of original image in the area other than the trash area.

15 Claims, 15 Drawing Sheets

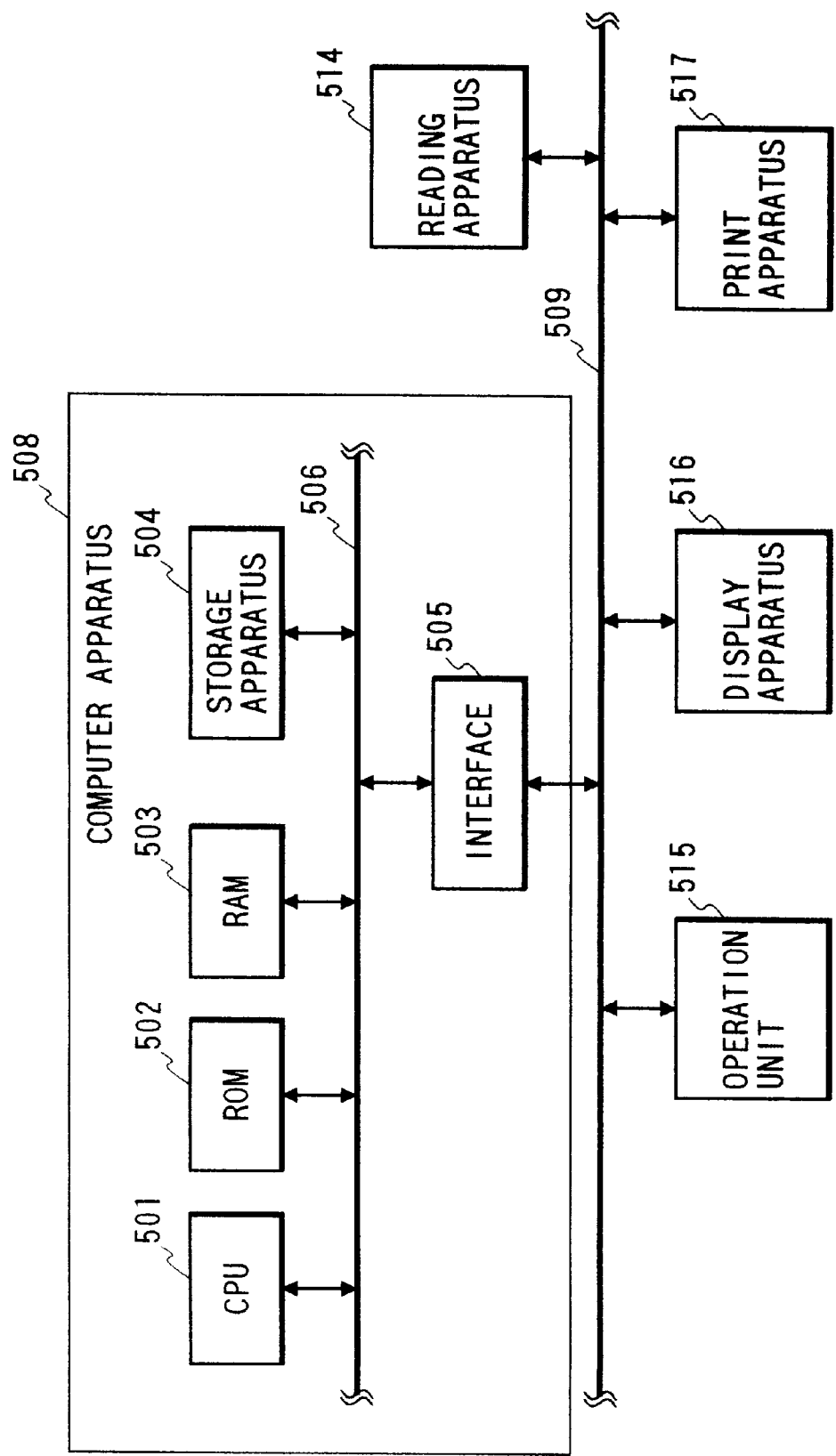

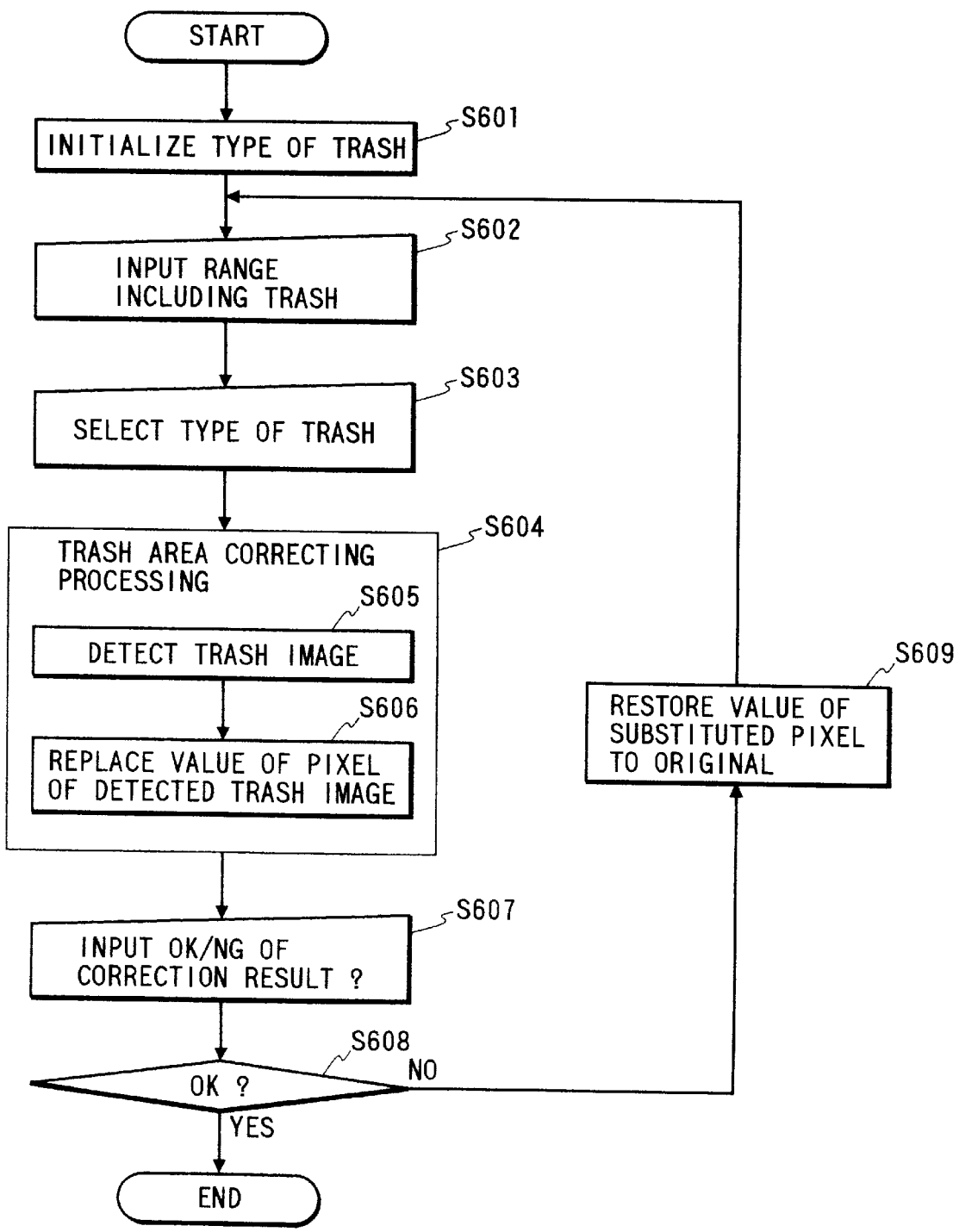

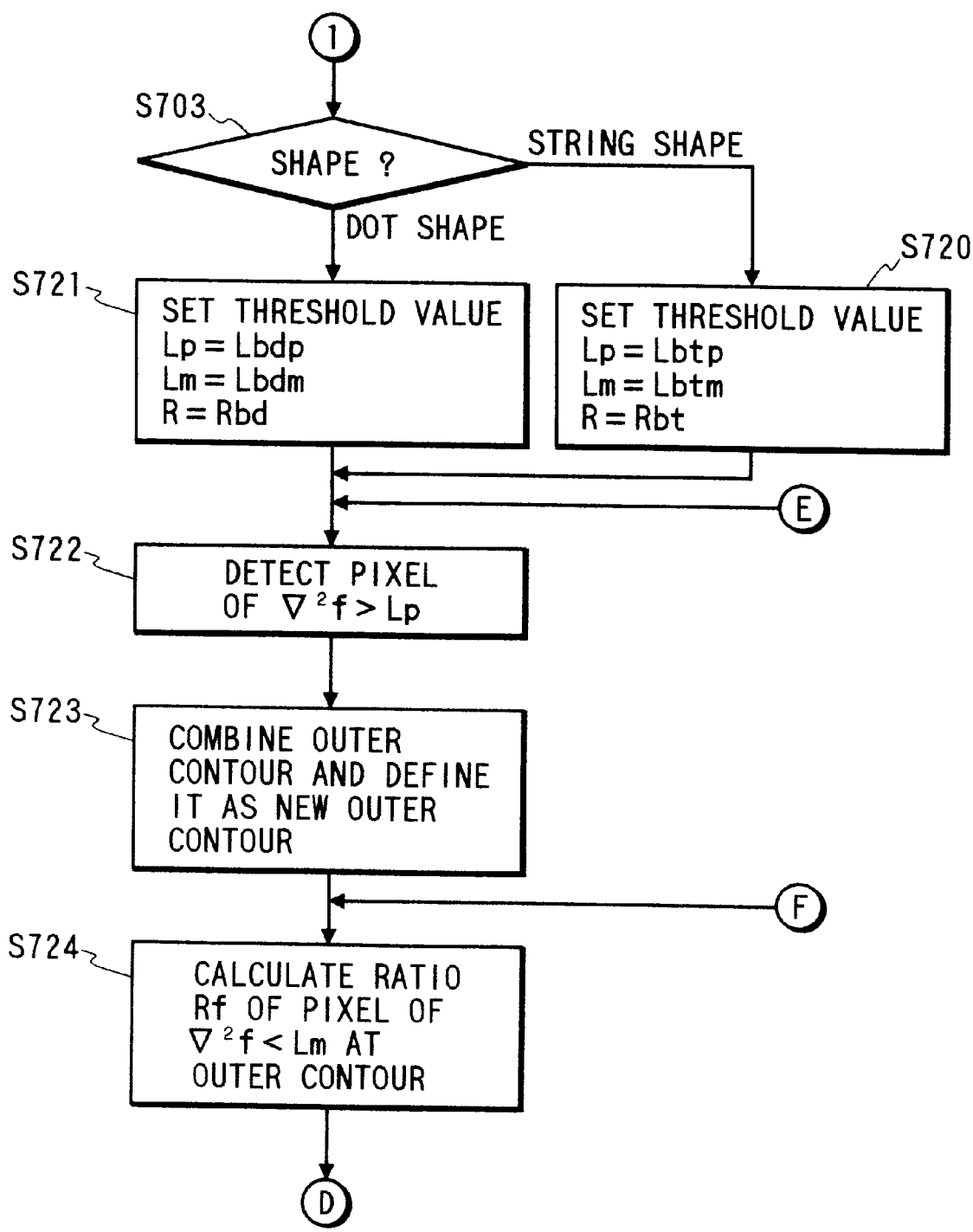

- ■ TARGET PIXEL P
- ▨ TASH AREA PIXEL D
- ▨ SURROUNDING PIXEL B

| 1 | 1 | 1 |
|---|---|---|
| 1 | -8 | 1 |
| 1 | 1 | 1 |

… # IMAGE PROCESSING METHOD, AN IMAGE PROCESSING APPARATUS, AND A STORAGE MEDIUM READABLE BY A COMPUTER

BACKGROUND OF THE INVENTION

1. Field of the Invention

The present invention relates to an image processing method, an image processing apparatus, and a storage medium readable by a computer.

2. Related Background Art

When an image recorded on a source document, such as a film or a printed object, is read by a scanner and inputted into a computer as a digital image, it is only natural that an image with dusts, trash particles, or the like adhering to it (hereinafter, referred to as a trash image) is mixed with the digital image if the image is read together with them still remaining on the source document. For example, if a source document is a negative film, dusts or trash particles adhering to the film often appear as the trash image of white dots or white string on the digital image.

Fundamentally, the "trash image" is an image which is not contained in the source document as information. It is derived not only from some dusts or trash particles adhering to a film as described above or from scratches on the film, but also, from noises mixed in the signals transmitted when reading a source document.

However, it has been unable to remove different kinds of trash images efficiently, while maintaining the image quality by suppressing the deterioration thereof.

SUMMARY OF THE INVENTION

The present invention is designed with a view to solving the problems existing in the conventional art. It is an object of the invention to provide an image processing apparatus capable of detecting trash images and other images that should be detected from among image data in good precision, and to provide a method therefor, as well as a storage medium readable by a computer.

It is another object of the invention to provide an image processing apparatus capable of removing trash images, while maintaining the image quality by suppressing the deterioration thereof, and to provide a method therefor, as well as a storage medium readable by a computer.

In order to achieve the objects described above, the image processing method of the present invention comprises the steps of setting a threshold value in accordance with the properties of an objective trash image to be detected; calculating the quadratic differential value of the pixel value of inputted image data; comparing the quadratic differential value and the threshold value; and detecting the trash image candidate contained in the inputted image data in accordance with the result of the comparison.

It is still another object of the invention to provide an image processing apparatus provided with new functions, and to provide a method therefor, as well as a storage medium readable by a computer.

Other objectives and advantage besides those discussed above will be apparent to those skilled in the art from the description of preferred embodiments of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 is a block diagram which schematically shows the structure of a digital image processing apparatus in accordance with a second embodiment of the present invention.

FIG. 6 is a flowchart which shows one example of the trash image detection processing in accordance with the second embodiment of the present invention.

FIGS. 7A, 7B, 7C and 7D are flowcharts which illustrate in detail the procedural example of the trash image detection processing in accordance with the step S605 shown in FIG. 6.

DETAILED DESCRIPTION OF THE PREFERRED EMBODIMENTS

Hereinafter, with reference to the accompanying drawings, the description will be made of the embodiments in accordance with the present invention.

First Embodiment

Figure 1:
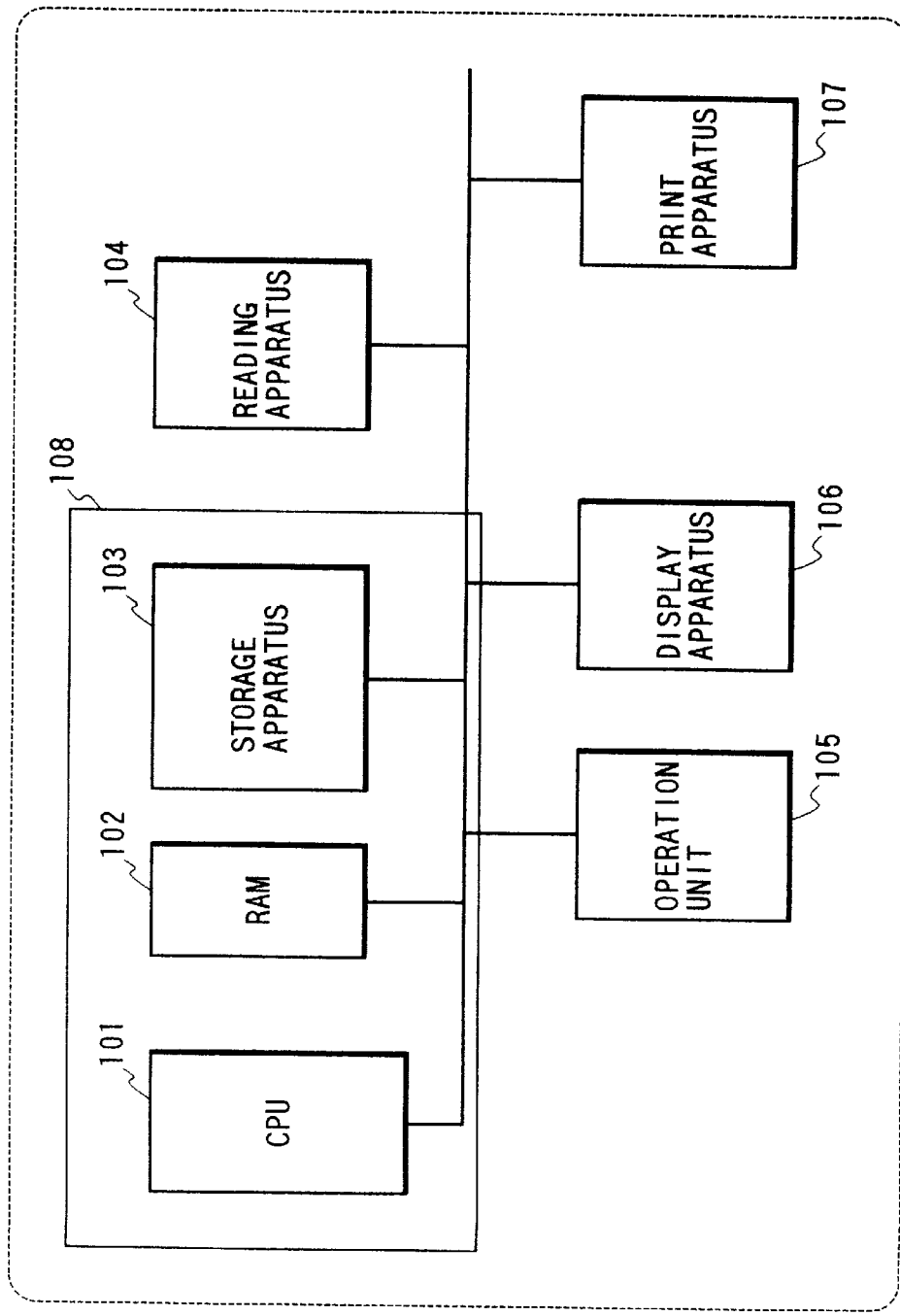
FIG. 1 is a block diagram which schematically shows the structure of an image correction and processing apparatus which carries out a method for correcting and processing images in accordance with a first embodiment of the present invention.

FIG. 1 is a block diagram which schematically shows the structure of the image processing apparatus that carries out the image processing method therefor.

A CPU 101, a storage apparatus 103 and a RAM are installed in a personal computer 108. The CPU 101 transfers the program stored in the storage apparatus 103 on the RAM. In accordance with the program thus transferred, the CPU executes the correction processing of a digital image. Also, the CPU 101 reads image data by means of a reading apparatus 104 in order to store them on the storage apparatus 103.

The operation unit 105 receives an operational command from the operator to carry out the correction process of image data, and transfers such operational command to the CPU 101. The operation unit 105 may be either one of the input apparatuss, such as a joy stick, a digitizer, a mouse, a key board, and an input pen, or use some of them together as the case may be.

The display apparatus 106 is arranged to present an image yet to be processed and an image that has been processed in accordance with an operation intended by the operator so that the operator is able to confirm the image visually before and after the execution of the image correction process. Here, it may be possible to display an image yet to be processed and an image that has been processed at a time. In this case, it becomes possible for the operator to visualize the extent of the process that should be executed at a glance. If the operator may find trash on the image that has been presented on the display apparatus 106, it is possible for him to roughly designate a rectangular area as an objective area to be processed, which includes the trash that the operator desires to remove by use of the operation unit 105 (here, it is assumed that pixels are arranged two dimensionally in accordance with the x-y orthogonal coordinates).

Also, the printing apparatus 107 outputs the image data accumulated in the RAM 102 or the storage apparatus 103 on a recording sheet as prints in accordance with the intended operation of the operator.

Figure 2:
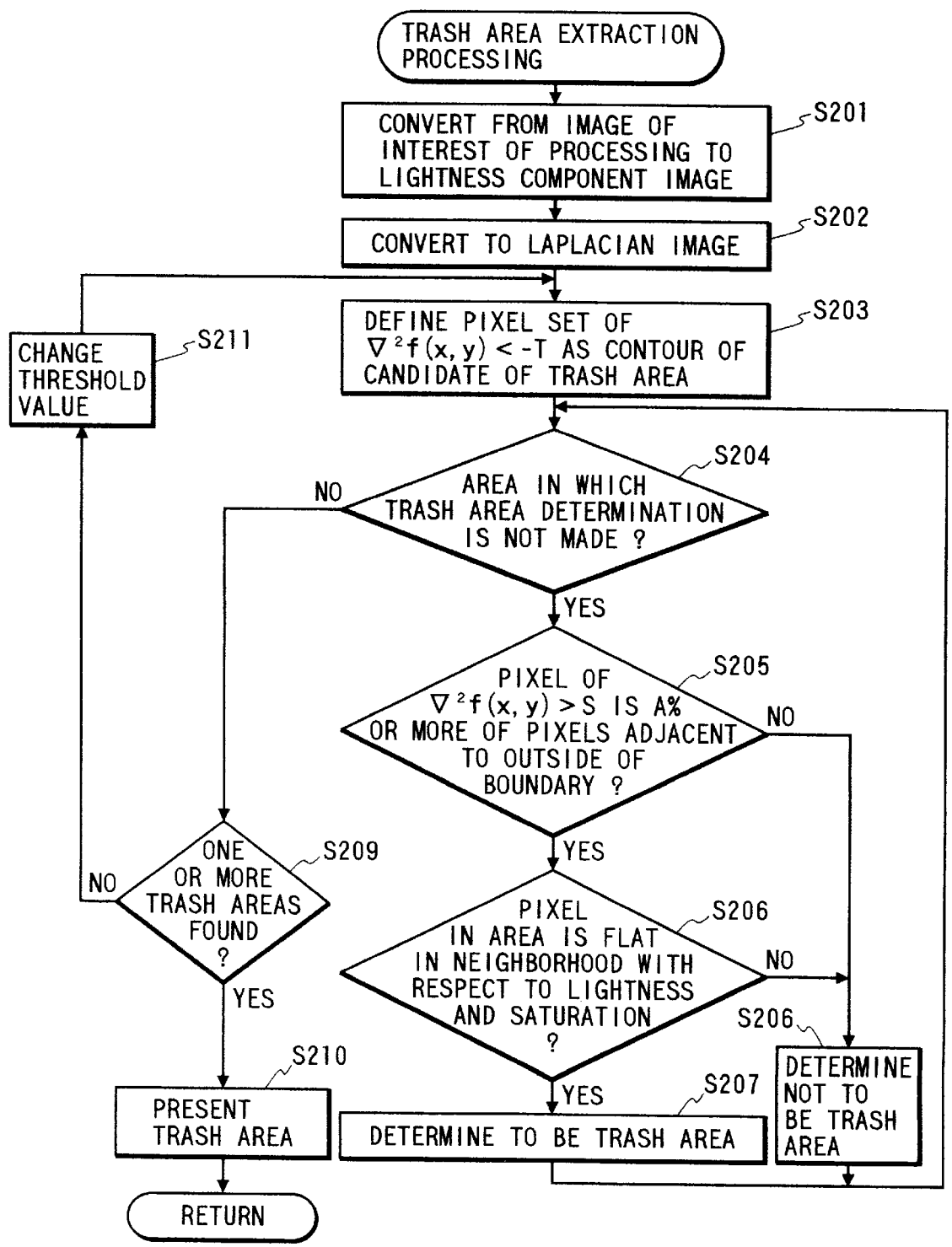
FIG. 2 is a flowchart which shows the process flow of the trash area extraction in accordance with the first embodiment of the image correction and processing method of the present invention.

FIG. 2 is a flowchart which shows the process flow of the trash area extraction from the image area designated by the operator as an objective area to be processed as described above. This flowchart shows the process flow to be executed by the CPU 101 in accordance with the program stored in the storage apparatus 103.

At first, in step S201, an image formed by lightness component is extracted from the portion of the image (objective image to be processed) from which the operator intends to remove the trash.

If the image signals read by the reading apparatus 104 are signals having RGB components, lightness is extracted from the R, G, and B signals, respectively. In other words, the known conversion is carried out from the RGB color space to the HVS color space. In this respect, the V of the HVS space is exemplified as lightness. However, it is of course possible to use the other color space, such as L*a*b*L* indicates lightness), HIS (I indicates lightness), HVC (V indicates lightness), among some others.

Now, in step S202, a Laplacian operation is executed for the image f(x, y) that has only lightness component in order to emphasize the edge thereof, thus obtaining the Laplacian image $\nabla^2 f(x, y)$.

In step S203, from the edge emphasized in the step S202, each pixel, which has its quadratic differential value obtained by the Laplacian operation (hereinafter, simply referred to as "quadratic differential value") as negative, and also, has a certain threshold value or less, namely, a large absolute value (−T), is extracted, and the set of such pixels is defined as the contour. The set of pixels thus defined, which is surrounded by the contour including the contour itself, is established as a candidate of trash area.

In step S204, the candidate trash area thus obtained in the step S203 is examined to find whether or not there is still any area in it, the trash area of which is yet to be determined. If affirmative, the process proceeds to step S205. If not, it proceeds to step S209.

In accordance with the result of the examination carried out in the step S204, determination is made in the step S205 on a certain trash area candidate where the trash area determination has not been made. More specifically, if there are pixels having positive quadratic differential value, which is the threshold value (S) or more among the pixels adjacent to the outer side of the boundary (contour) of the trash area candidate extracted in the step S203, and the numbers of such pixels are found to be more than a certain ratio (A %), the area formed by such pixels is defined as a trash area candidate. Then, the process proceeds to step S206. Otherwise, it proceeds to step S208. In other words, in the steps S203 and S205, it is assumed that the changes of lightness value are abrupt on the boundary of trash area, and then, if the set of pixel pairs presents a large change from the positive to negative in its quadratic differential values in the vicinity thereof, such change is adopted as the conditional requirement for defining the boundary of the trash area. Here, in the steps S203, S204, and S205, the operations are carried out only for the white trash whose lightness is higher than that of the pixels surrounding them. However, by inverting the positive and negative of the threshold value and the inequality sign adopted for setting the condition of detection, it becomes possible to detect black trash whose lightness is lower than the pixels surrounding them.

In the step S206, based upon the following standard, examination is made for the pixels in the aforesaid trash area candidate to determine whether or not such pixels are flat in the vicinity of each pixel (changes are smaller in it); if the standard is satisfied, the process proceeds to step S207, otherwise to step S208:

$$|f(x, y) - f(x_0, y_0)| \leq U$$

and $$|g(x, y) - g(x_0, y_0)| \leq V$$

This standard is set to examine whether or not the vicinity (x, y) of the point $(x_0, y_0)$ in the trash area candidate is satisfied. Here, the f(x, y), g(x, y) represent lightness and saturation, respectively, and the U and V are appropriate threshold values.

In step S207, it is confirmed if the aforesaid trash area candidate is a trash area. Then, after having stored the confirmed event, the process returns to the step S204.

In step S208, if the aforesaid trash area candidate is determined not to be any of the trash areas, the process returns to the step S204 after such event is recorded.

In step S209, depending on whether or not one or more trash areas are found, the process proceeds to step S210 if any found. If none of them is found, the process proceeds to step S211.

In step S210, the trash area thus extracted is indicated on the display apparatus 106 to notify the operator accordingly. Then, the trash area extraction processing is completed. There is no need for any further operation of this extraction processing with respect to the portion detected as dusts as intended by the operator. Meanwhile, by the application of a release instruction that may be inputted through the operation unit 105, it is possible to release the trash area designation for any portion that has been detected as trash contrary to the intention of the operator.

In step S211, the parameters (threshold values) used in the steps S203, S205, and S206 can be modified appropriately to ease the condition of detection (that is, to make it easier to carry out detection). Then, the process returns to the step S203.

As described above, the image in the rectangular area including trash designated by the operator is processed, and the portion determined as the trash area in it becomes the object of the interpolation process of the trash area which will be carried out as given below.

Figure 3:
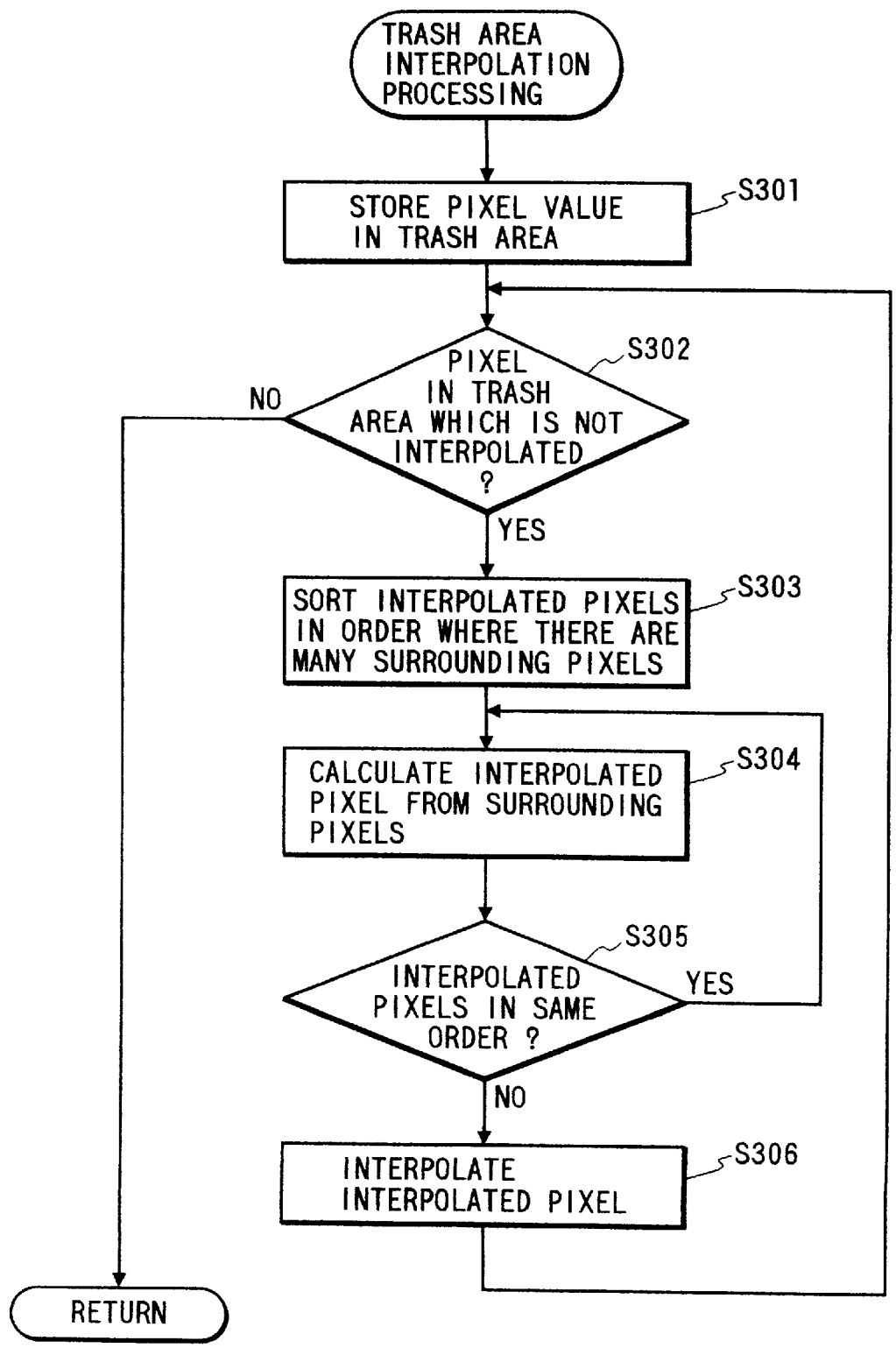
FIG. 3 is a flowchart which shows the process flow of the trash area interpolation in accordance with the first embodiment of the image correction and processing method of the present invention.

FIG. 3 is a flowchart which shows the flow of the interpolation process to be executed on one trash area among those trash areas obtained as shown in FIG. 2. This flowchart is also the one that shows the process flow to be carried out by the CPU 101 in accordance with the program stored on the storage apparatus 103 as in the case described in conjunction with FIG. 2.

At first, in step S301, the pixel values (that is, the signal values of the lightness component, saturation component, hue component, and others) of the entire trash area, which should be interpolated, are stored in the RAM 102 or the storage apparatus 103. This value is utilized by the operator for returning the process to the original image when the operator issues an instruction to cancel interpolation after the completion of the interpolation process of the trash area.

Then, in step S302, examination is made to determine whether or not there is any pixels yet to be interpolated in one trash area. If affirmative, the process proceeds to step S303. If not, the process of interpolation for that particular trash area is completed. If necessary, the same interpolation process is initiated for another trash area.

In the step S303, examination is made to ascertain the numbers of circumferential pixels which should be effective in carrying out the interpolation. This examination is made per pixel (to be interpolated) in the trash area.

Figure 4C:
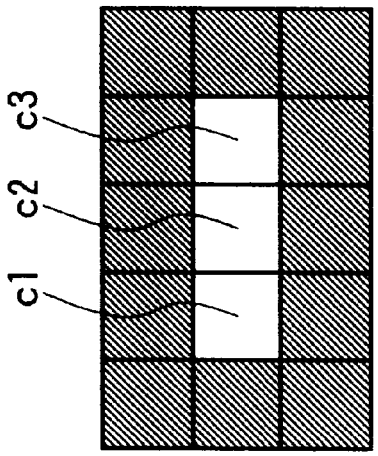
FIGS. 4A, 4B and 4C are views which schematically illustrate the effective circumferential pixels in accordance with the first embodiment of the image correction and processing method of the present invention.
Figure 4B:
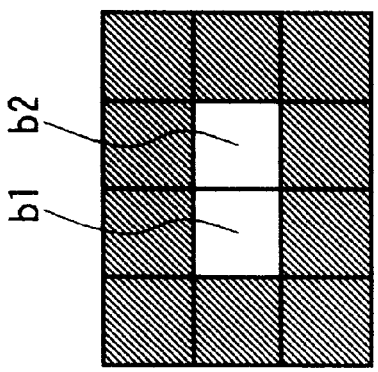
Figure 4A:
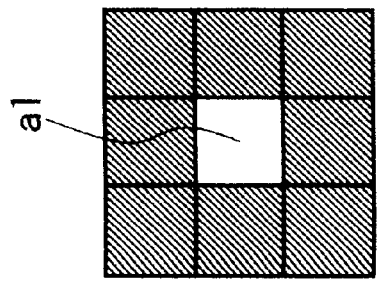
Figure 7A:
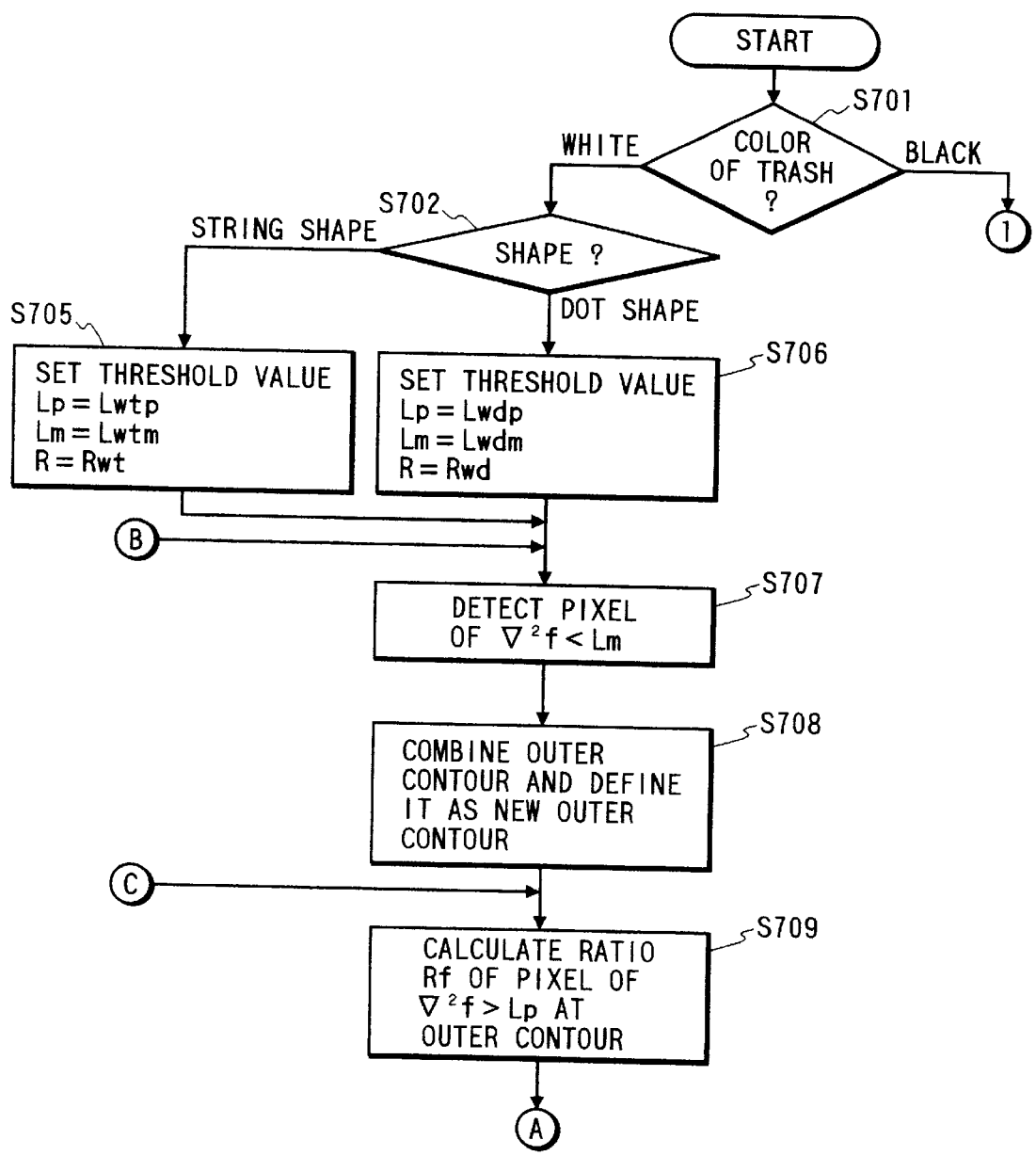
Figure 7B:
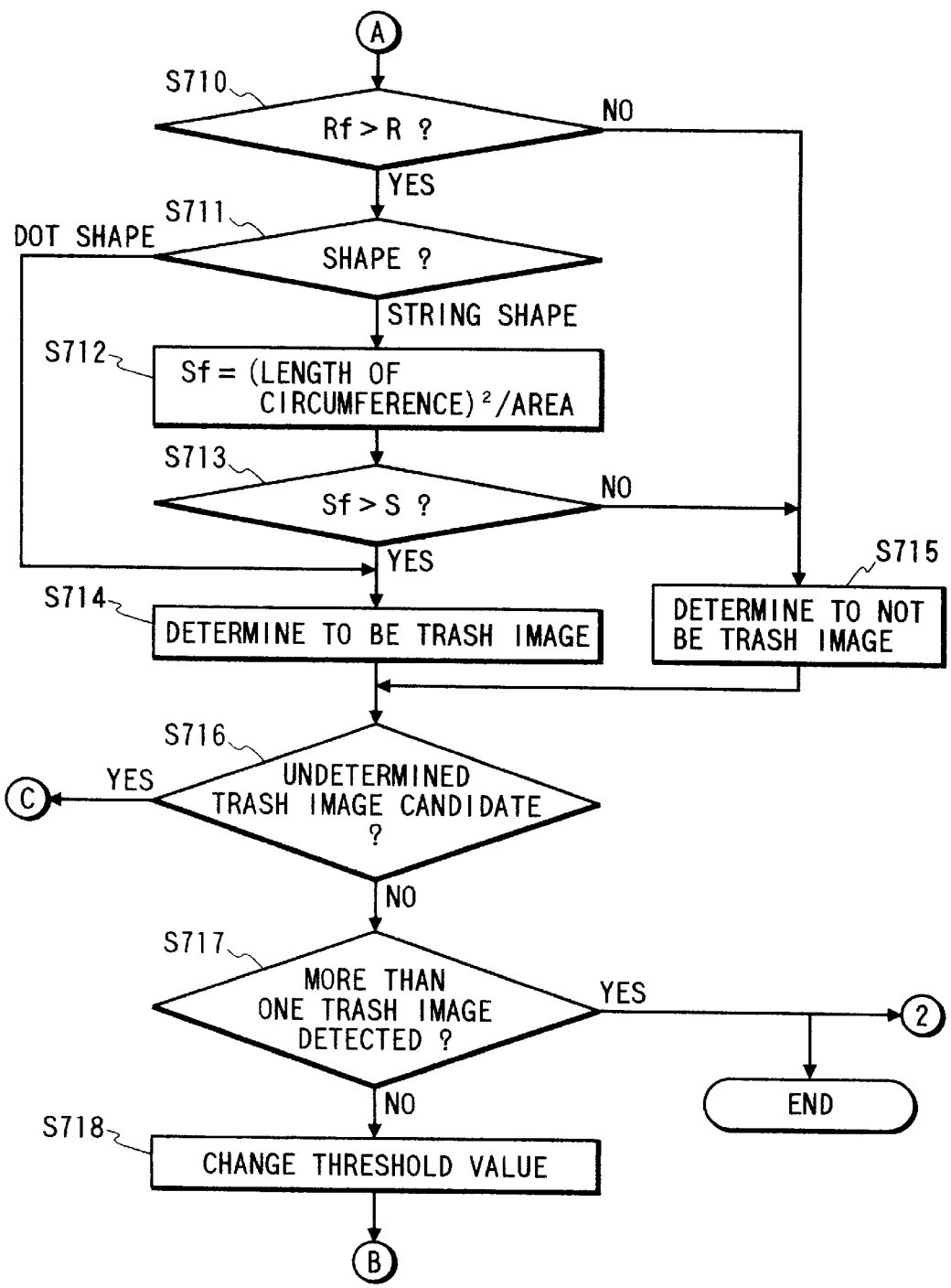
Figure 7D:
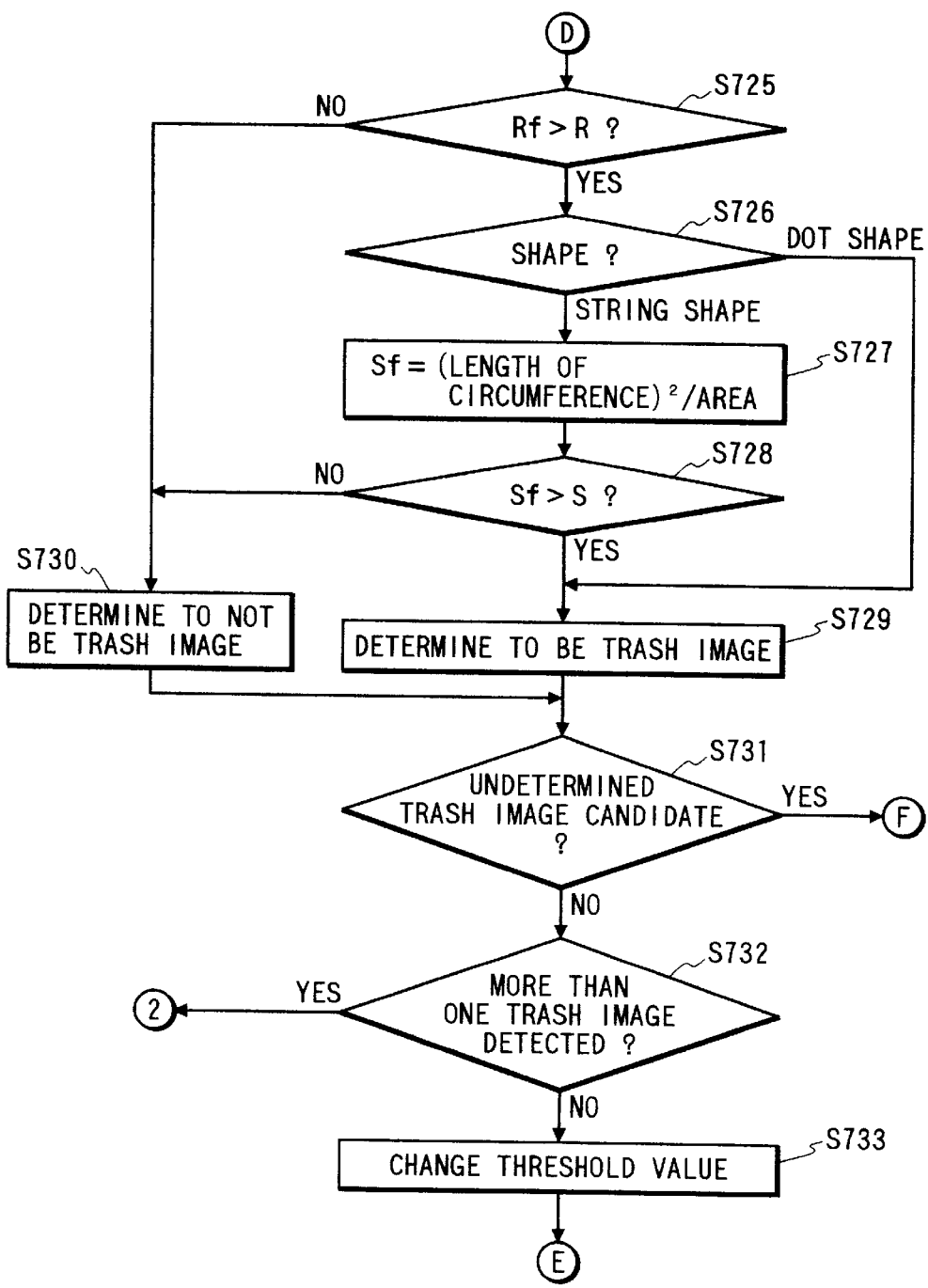

FIGS. 4A to 4C illustrate the example in which the effective numbers of the circumferential pixels are counted for the execution of the interpolation. In this respect, the description will be made of the case where the effective range of the circumferential area is set at the eight vicinities (that is, the adjacent pixels in the eight directions, namely, right, left, up, down, upper right, upper left, lower right, and lower left). In FIGS. 4A to 4C, the void pixels (a1, b1, b2, c1, c2, and c3) represent the pixels in the trash area. Those painted pixels represent the image that surrounds the trash area. In FIG. 4A, only pixel a1 forms the trash area. The pixels in the eight vicinities thereof do not belong to the trash area. The circumferential pixels effectively adoptable for the execution of interpolation are eight. In FIG. 4B, with the pixels b1 and b2, the effective circumferential pixels are seven. In FIG. 4C, the effective circumferential pixels of the pixels c1 and c3 are seven. However, the effective circumferential pixels of the pixel c2 are six. In this respect, after the pixels c1 and c3 have been interpolated, these two pixels can be treated as the effective circumferential pixels of the pixel c2. Thus, the effective circumferential pixels of the pixel c2 become eight.

Further, in the step S303, the pixels in the trash area are sorted in order of the larger numbers of the effective circumferential pixels that have been obtained as shown in the example described above.

Then, in step S304, the average value of the signals of the effective circumferential pixels is obtained as the signal value of the pixels to be interpolated, and stored accordingly.

In step S305, examination is made to ascertain if there are still any pixels to be interpolated, the interpolated pixels of which are the same as the numbers of the effective circumferential pixels, and also, the result of sorting of which is the same order in the step S304. If affirmative, the process proceeds to the step S304. Otherwise, the process proceeds to step S306.

In the step S306, the interpolating value obtained in the step S304 is assigned to each of the corresponding signal values of the pixels to be interpolated. Then, after the interpolation is carried out, the process returns to the step S302. Here, the pixels interpolated in the step S306 are allowed to function as effective circumferential pixels for the pixels yet to be interpolated in the next loop.

In the algorithm described above, the pixels interpolated are included in the effective circumferential pixels, and then, the interpolation process is carried out from the boundary portion of the trash area where the numbers of the effective circumferential pixels are larger to the central portion of the trash area where the number of the effective circumferential pixels are smaller in that order. As a result, there is no possibility that any conspicuous boundary is formed between the trash area and the area outside thereof even for a comparatively large trash area. Also, it is possible to execute interpolation to smooth pixels themselves within a trash area.

In accordance with the first embodiment, the trash area of a digital image that contains dusts, trash particles, or the like is extracted at first. Then, only such area is interpolated by use of the effective circumferential pixels thereof. Therefore, it is possible to remove them efficiently for the correction of an image without deteriorating the original image which remains as it is in the area other than the trash area.

Second Embodiment

FIG. 5 is a block diagram which schematically shows the structure of a digital image processing apparatus in accordance with a second embodiment of the present invention.

In FIG. 5, a computer 508 comprises a CPU 501, a ROM 502, a RAM 503, and a storage apparatus such as a hard disk, which are connected with each other by means of an inner bus 506. In accordance with the BIOS stored in the ROM 503, the CPU 501 transfers the program stored in the storage apparatus 504 to the RAM 503 so that the CPU carries out image processing and others in accordance with the program thus transferred to the RAM 503. Also, the CPU 501 communicates with equipment connected with the external bus 509 through the interface 505.

Through an operation unit 515, such as a key board, a pointing apparatus, the operator of this apparatus inputs the image processing instructions and other commands, and the data to be used for processing. Such instructions and data are transferred to the CPU 501 through the external bus 509 and the inner bus 506 as well. For example, if an instruction inputted through the operation unit 515 is to read an image on an oridinal document, the CPU 501 controls a film scanner, an image reader or some other reading apparatus 514 and reads the image on the source document, and then, stores in the RAM 503 the image data thus obtained and the kind of the source document on the storage apparatus 504. Also, if an image printing is instructed, the CPU 501 transfers the image data stored on the RAM 503 or on the storage apparatus 504 to the printing apparatus 517 to record images on a recording sheet in accordance with the image data.

The CPU 501 indicates the results of process and the progressive status of the process on a display apparatus 516, such as a CRT or a LCD, in order to notify the operator accordingly. The information indicated on the display apparatus 516 may include the instructions and data input and the results of the image processing of those having been read for input, among some others. It is of course possible for the operator to display an image yet to be processed or the one that has been processed as he desires. As in the case of the first embodiment, both the image yet to be processed and the image that has been processed may be indicated on the display apparatus at a time. As an image processing method whereby to remove trash images from a digital image, there is the method for giving graduation to the entire image area including the objective trash images by smoothing all the pixels evenly in the image area designated by the operator (hereinafter, referred to as a "smoothing method") or the method for substituting the average value of the circumferential pixels for the value of the pixels that form the objective trash image that has been detected as in the first embodiment (hereinafter, referred to a "substitution method").

If the smoothing method is adopted, the image area which does not contain any of the trash images is also smoothed. As a result, the quality of images in such area may be deteriorated in some cases. If the substitution method is adopted, it is difficult to establish a standard that is equally applicable to the detection of trash images without depending on the kinds of dusts or trash particles and the kinds of source documents as well. Therefore, it is impossible for this method to detect trash images irrespective of the kinds thereof in any case. As a result, there is still a problem that not all the kinds of trash images can be removed simply by means of the substitution method.

Further, when the trash image is substituted by the average value of the circumferential pixels in accordance with the first embodiment described above, the natural variation of pixel values that may be provided usually by the circumferential area is lost for the pixels in the area where the pixel values have been substituted. Therefore, such images may become flatter than those surrounding them so as to make the difference between them inevitably conspicuous in some cases.

Hereinafter, with a view to solving the problems described above, the description will be made of the removal process of trash images in accordance with the second embodiment of the present invention.

Detection of Trash Images

FIG. 6 is a flowchart which shows one example of the detection process of trash images in accordance with the second embodiment of the present invention. This process is carried out by the CPU 501 when a trash image removal instruction is issued through the operation unit 515.

In step S601, it is initialized to determine the kind of trash in accordance with the kind of a source document of the image to be processed (a negative film, a positive film or the like, for example). Here, the color of trash images is initialized as "white" if the source document is a negative film, and as "black" if it is a positive film, for example.

Then, in step S602, the image to be processed is represented on the display apparatus 516. Through the operation unit 515, the operator designates a roughly rectangular image area containing the trash image to be removed. Then, in step S603, the kind of the trash thus initialized and the other kinds of trash are indicated on the display apparatus. The operator selects from among those indicated on the display apparatus the kind of trash that corresponds to the trash image to be removed. Here, if the initialization of the trash kind does not need any correction, the operator leaves it intact. Also, to define the kinds of trash, it is possible to select the color of trash (white or black, for example), the shape of trash (string, dot, straight or curved scratches, for example) among some others. In this manner, the kinds of trash images may be defined for easier detection. Here, of course, the arrangement is made so that a plurality of rectangular image areas can be designated, and that the kind of trash can be designated per image area.

Also, as a method for designating the image area, it may be possible to designate one point inside the trash image on an image represented on the display apparatus 516, and to define a sufficient circumferential area centering on such designated point as an objective image area. Further, the image area is not necessarily rectangular. It may be circular, oval or the like. For the designation of the shape, the arrangement is made to enable the operator to designate it through the operation unit 515.

Then, in step S604, the trash area correction process is carried out to remove the trash image. The details will be described later. However, in step S605, the trash image is detected in the rectangular area thus designated. In step S606, the value of pixels detected as those forming the trash image is substituted by the pixel value of the circumferential area of the pixels thus detected.

Then, in step S607, the result of correction, that is, the image for which the trash area correction process has been executed, is indicated on the display apparatus so as to enable the operator to determine whether or not the desired result of correction is obtained. In step S608, the process is completed if the operator inputs an indication of "good result" through the operation unit 515. Otherwise, the value of the pixels (that is, the pixels detected as those forming the trash image), for which the substitution process is executed in the step S606, is restored to the original value. Then, the process returns to the step S602. Here, in step S609, it may be possible to restore the entire image data to the original image data stored on the storage apparatus 504 or the like if the numbers of the pixels are large, for which the substitution process should be executed in this respect.

FIGS. 7A to 7D are flowcharts which illustrate the detailed procedural example of the trash image detection process in the step S605.

At first, the process is branched depending on the kinds of trash selected in the steps S701 to S703 in order to set an appropriate threshold value for use of the detection of each trash contour. In other words, if the selected kind of trash is the "white string", the process proceeds to step S705. In this step, the Lwtp and the Lwtm are defined for the positive threshold value Lp and the negative threshold value Lm, respectively, in order to compare with the quadratic differential value of the lightness component of a digital image in colors (L*component of the L*a*b* data, for example). Then, the Rwt is defined for the threshold value R of the ratio of the pixel numbers that satisfy the condition. Also, if the selected kind of trash is the "white dot", the process proceeds to step S706. In this step, the Lwdp and the Lwdm are defined for the threshold values Lp and Lm, and also, the Rwd is defined for the threshold value R of the ratio of the pixel numbers that satisfy the condition.

Figure 9:
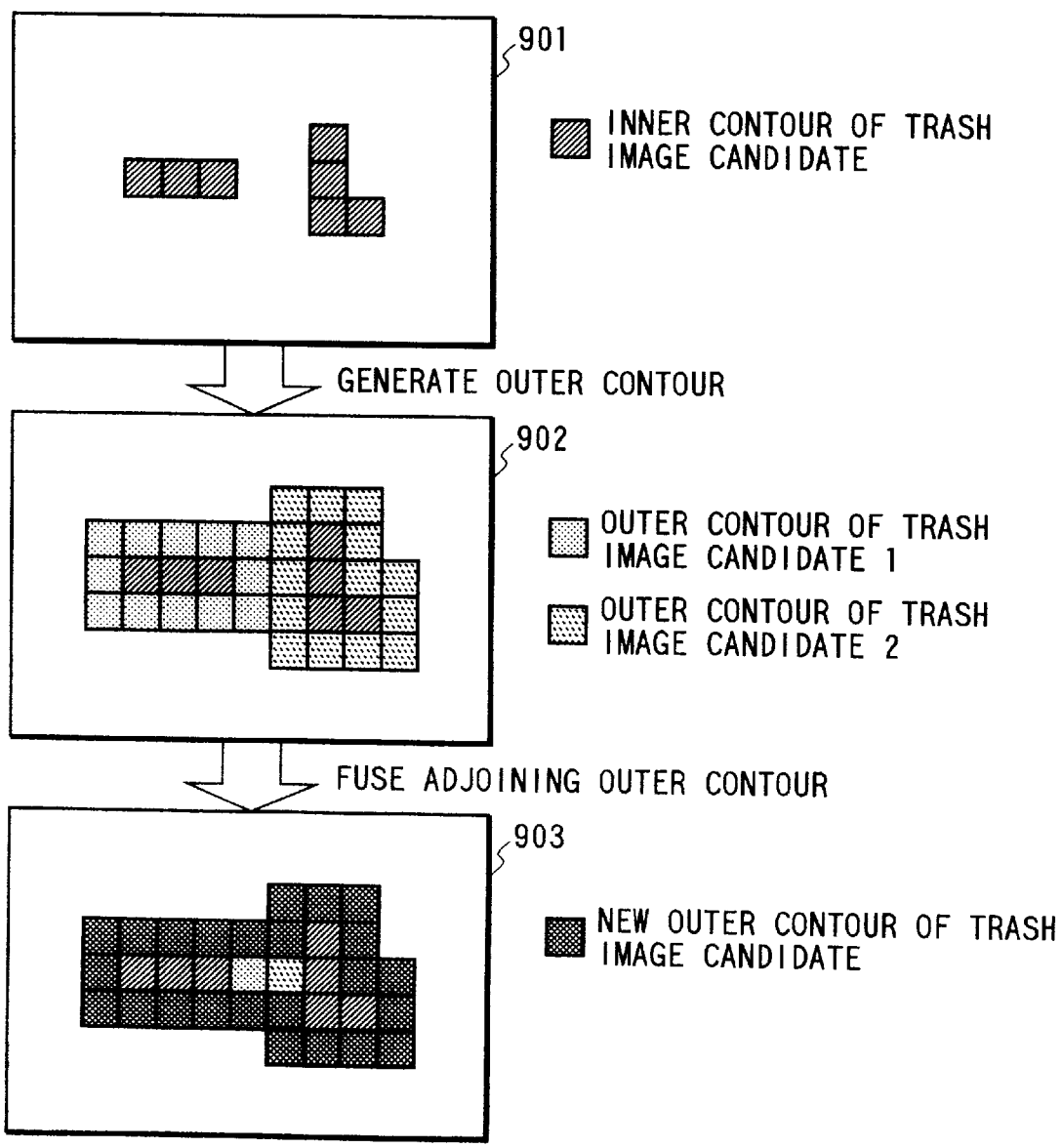
FIG. 9 is a view which shows the example of process in which the outer contours of trash image candidates are joined together.

Now, continuously in step S707, the value $\nabla^2 f$ is obtained by beginning the Laplacian operation $\nabla^2$, that is, the quadratic differential operation of the lightness component of a digital image, and then, the pixels for which the value thus obtained becomes smaller than the threshold value Lm are detected from the designated rectangular image area. Here, the pixels thus detected are made to be the set of the inner contours of the trash image candidate. Subsequently, in step S708, the pixels adjacent to the outer side of the inner contours of the trash image candidate thus obtained are made to be the set of the outer contours. As shown in FIG. 9, the sets of the outer contours adjacent to each other are joined together to make them a new set of the outer contours for the trash image candidate.

Then, in step S709, the ratio of pixels Rf, for which the quadratic differential value $\nabla^2 f$ of the lightness component is larger than the positive threshold value Lp, is obtained for one of the outer contours of the set of the outer contours thus obtained for the trash image candidate. In step S710, the ratio Rf and the threshold value R are compared. If the Rf is not larger than the R, that is, if the ratio of the pixels having the quadratic differential value $\nabla^2 f$ which is larger than the positive threshold value Lp does not arrive at a specific value (the Rwt or the Rwd), the process proceeds to step S715 where the objective area is determined not to be any of the trash image areas. In other cases where the ratio of the pixels having the quadratic differential value $\nabla^2 f$ of the lightness component, which is larger than the positive threshold value Lp, is a specific value (the Rwt or Rwd) or more, the process proceeds to step S711.

In the step S711, if Rf>R, the shape of the selected trash is determined. If the trash is dot, the process proceeds to S714 to determine if it is a trash image. Also, if the shape is string, the process proceeds to step S712. In the step S712, the length of the outer contour of the trash image candidate thus obtained and the area surrounded by the outer contour thereof are calculated. Here, the square of the circumferential length is divided by the obtained area. The value thus arrived at is assigned to the Sf. The threshold value S, which is used in the step S713 for determining the shape of the objective area in accordance with the provisionally defined string trash configuration, is compared with the Sf, which is the ratio between the square of the circumferential length and the area. Then, if the result is Sf>S, the objective area is determined to be a trash image in step S714. Otherwise, it is determined not to be any of the trash images in step S715.

Subsequently, in step S716, examination is made to determine whether or not there is any other trash image candidate whose trash image determination has not been made in the step S709 to the step S715 among those trash image candidates that have been detected in the step S708. If affirmative, the process returns to the step S709 where each of such trash image candidates is examined and determined accordingly.

Then, in step S717, examination is made to ascertain whether or not there is at least one candidate that has been determined to be a trash image among those trash image candidates detected in the step S708. If affirmative, the process is completed. If none of them is found, the process proceeds to step S718. In the step S718, the threshold values that have been defined in the step S705 or in the step S706 are modified so as to ease the condition whereby to detect trash images. After that, the process returns to the step S707.

Meanwhile, if the selected kind is "black dot", the process proceeds to step S721 where the Lbdp and the Lbdm are set for the threshold value Lp and the threshold value Lm, respectively, so as to set the Rbd for the threshold value R which defines the ratio of the pixel numbers that satisfies the condition. Also, if the selected kind is "black string", the process proceeds to step S720 where the Lbtm is set for the threshold values Lp and Lm so as to set the Rbt for the threshold value R which defines the ratio of pixel numbers that satisfies the condition.

Continuously, in step S722, the pixels, for which the quadratic differential value $\nabla^2 f$ of the lightness component is larger than the positive threshold value Lp, are detected from the designated rectangular image area, and the pixels thus detected are made to be the set of inner contours of the trash image candidate. Then, in step S723, the pixels adjacent to the outer side of the inner contours of the trash image candidate thus obtained are made to be the set of the outer contours. As shown in FIG. 9, the sets of the outer contours adjacent to each other are joined together to make them a new set of the outer contours for the trash image candidate.

Then, in step S724, the ratio of pixels Rf, for which the quadratic differential value $\nabla^2 f$ of the lightness component is smaller than the negative threshold value Lm, is obtained for one of the outer contours of the set of the outer contours thus obtained for the trash image candidate. In step S725, the ratio Rf and the threshold value R are compared. If the Rf is larger than the R, that is, if the ratio of the pixels having the quadratic differential value $\nabla^2 f$ which is smaller than the negative threshold value Lm does not arrive at a specific value (the Rwt or the Rwd), the process proceeds to step S730 where the objective area is determined not to be any of the trash image areas. In other cases where the ratio of the pixels having the quadratic differential value $\nabla^2 f$ of the lightness component, which is smaller than the negative threshold value Lm, is a specific value (the Rwt or Rwd) or more, the process proceeds to step S726.

In the step S726, if Rf>R, the shape of the selected trash is determined. If the trash is dot, the process proceeds to S729 to determine if it is a trash image. Also, if the shape is string, the process proceeds to step S727. In the step S727, the length of the outer contour of the trash image candidate thus obtained and the area surrounded by the outer contour thereof are calculated, and then, the square of the obtained circumferential length is divided by the obtained area. The value thus arrived at is assigned to the Sf. In step S728, the comparison is made between the threshold value S used for determining the shape of the objective area in accordance with the provisionally defined string trash configuration, and the Sf which is the ratio between the square of the length of the circumference and the area. Then, if the result is Sf>S, the objective area is determined to be a trash image in step S729. Otherwise, it is determined not to be any of the trash images in step S730.

Subsequently, in step S731, examination is made to determine whether or not there is any other trash image candidate whose trash image determination has not been made in the step S724 to the step S730 among those trash image candidates that have been detected in the step S723. If affirmative, the process returns to the step S724 where each of such trash image candidates is examined and determined accordingly.

Then, in step S732, examination is made to ascertain whether or not there is at least one candidate that has been determined to be a trash image among those trash image candidates detected in the step S723. If affirmative, the process is completed. If none of them is found, the process proceeds to step S733. In the step S733, the threshold values that have been defined in the step S721 or in the step S720 are modified so as to ease the condition whereby to detect trash images. After that, the process returns to the step S722.

Here, although not shown in FIGS. 7A to 7D, the limit is defined in advance so that the condition may be made easier for the detection of the trash image in the steps S718 and S733. Then, if the modification of condition has arrived at such limit before any one of trash images is detected, the message is indicated on the display apparatus accordingly, thus terminating the process.

Here, also, the term "white" means a higher lightness value, the term "black" means a lower lightness value in the example described above.

Figure 8:
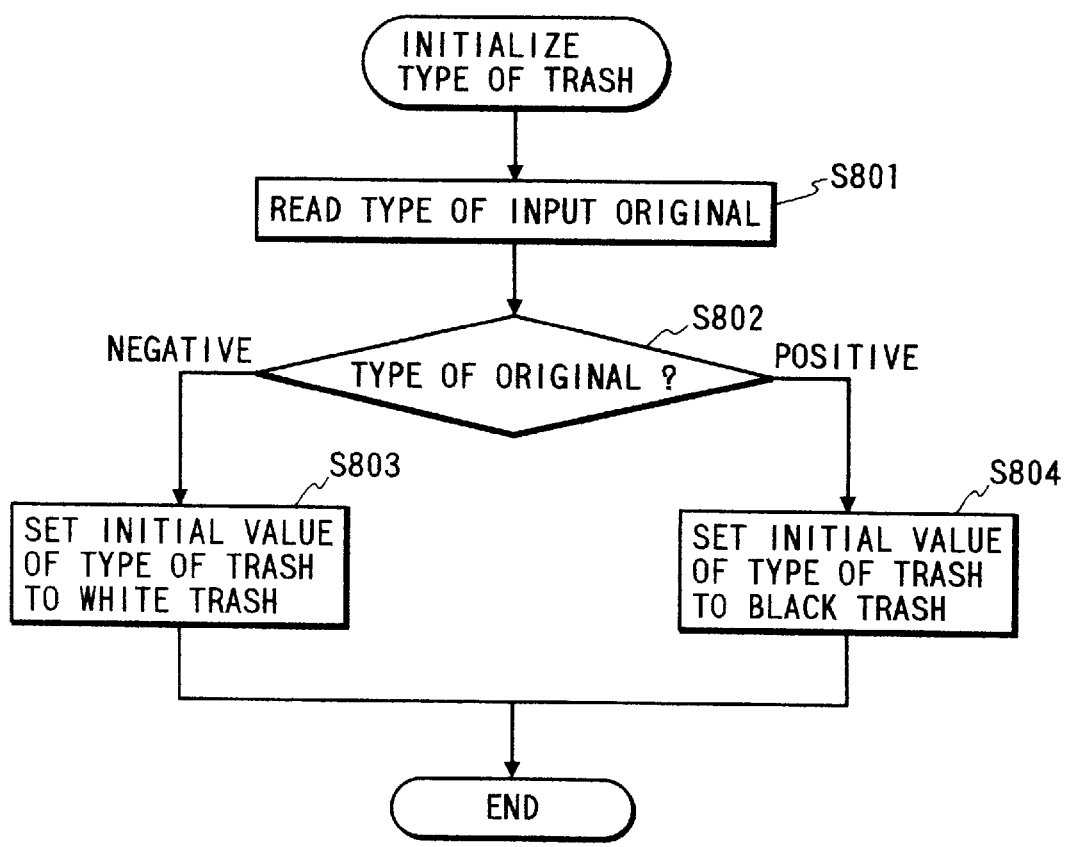
FIG. 8 is a flowchart which shows in detail the procedural example of the initialization of the trash kind in accordance with the step S601 shown in FIG. 6.

FIG. 8 is a flowchart which shows the detailed example of the initialization of the kind of trash in the step S601.

At first, in step S801, the kind of the source document stored on the storage apparatus 504 is discriminated and read by the reading apparatus 514. The image data stored on the storage apparatus 504 are also read together. Then, in step S802, the kind of the inputted source document is determined. If it is a negative film, the process proceeds to step S804 where the initial value is set as the "white trash". If it is a positive film, the process proceeds to step S804 where the initial value is set as the "black trash". The initialization is then completed. In this respect, the discrimination between the positive and negative films is made in accordance with information available from the surface of a cartridge that contains film if APS (Advanced Photo System) film is read, for example. Also, if a flat bed scanner or some other image scanner is used, it may be possible to discriminate one from another in accordance with the luminance histogram obtainable by the pre-scanning of a scanner to be used.

FIG. 9 is a view which shows the example of process whereby to join the outer contours of trash candidates. When the inner contours of a trash image candidate are detected as at 901, the outer pixels adjacent to the pixels in the inner contours within an area of eight pixels adjacent to the target pixel are made to be the outer contours as shown at 902. When the outer contours are formed, there occurs some case as shown at 902 where the outer contours are adjacent to two trash image candidates even when the inner contours themselves are apart from each other as shown at 901. If these two trash image candidates are processed as separate images, the pixels existing on the boundary between the two trash image candidates are provided with different pixel values which are not interrelated with each other. Therefore, it becomes necessary to join the trash image candidates. Here, as shown at 903, the adjacent outer contours are connected together to make them one outer contour.

Removal of Trash images

Figure 10:
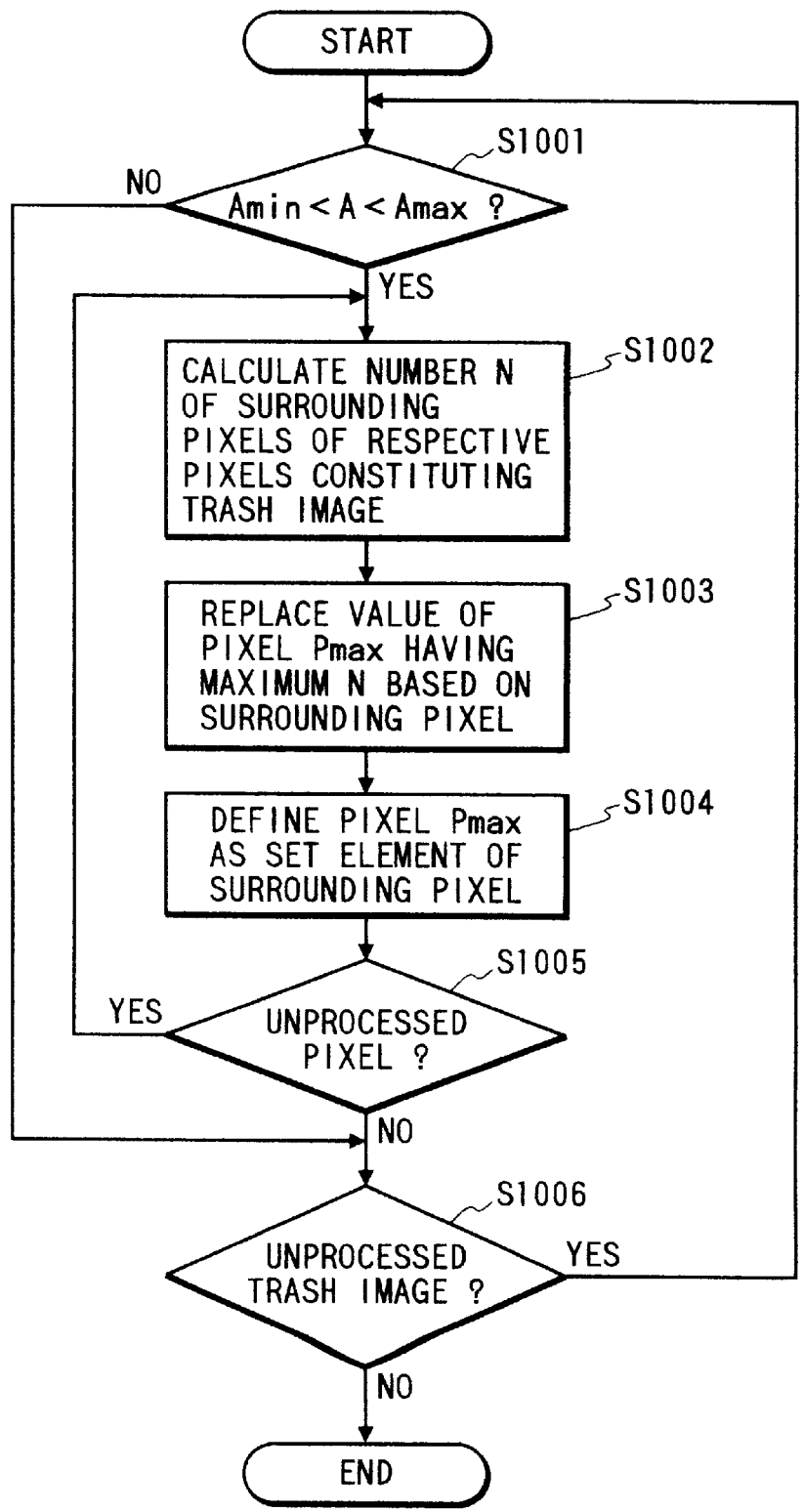
FIG. 10 is a flowchart which shows the example of trash image removal.

FIG. 10 is a flowchart which shows the example of process in which the trash image is removed. This is the process to remove the trash image detected by the trash image detection process represented in FIGS. 7A to 7D.

In step S1001, it is examined to determine whether or not there is one trash image area A within a certain area. Now, for example, an image printed by a printing apparatus 517 is observed. Here, the minimum area that sensed visually by the eye sight is given as Amin; the maximum area beyond which the image becomes unnatural when modified is given as Amax. Then, it is determined whether or not the area of one trash image satisfies the condition of Amin<A<Amax. If the condition of the Amin<A<Amax is not satisfied, no removal process is executed for this image, but the process jumps to step S1006. This is because the size of the trash image cannot be visually sensed if the condition is A≦Amin, and there is no need for its removal. Also, if the condition is A≧Amax, the corresponding image becomes unnatural if the trash image should be removed.

In step S1002, if the condition of Amin<A<Amax is satisfied, the number N of the circumferential pixels is obtained for the substitution of each value of pixels P that form the trash image D. In step S1003, the corrected pixel value of the pixel Pmax that has the largest number N of circumferential pixels is obtained from the circumferential pixels. The value of the pixel Pmax is substituted by the value thus obtained. Then, in step S1004, the pixel Pmax having the pixel value that has been substituted is also included in the circumferential pixels, and in step S1005, examination is made to determine whether or not there is still pixels yet to be processed in the trash image D. If affirmative, the process returns to the step S1002. If all the pixels have been processed, the process proceeds to step S1006. Then, in the step S1006, examination is made to determine whether or not there are any trash images yet to be processed. If none of them is found, the process terminates. Otherwise, the process returns to the step S1001.

Figures 11, 12:
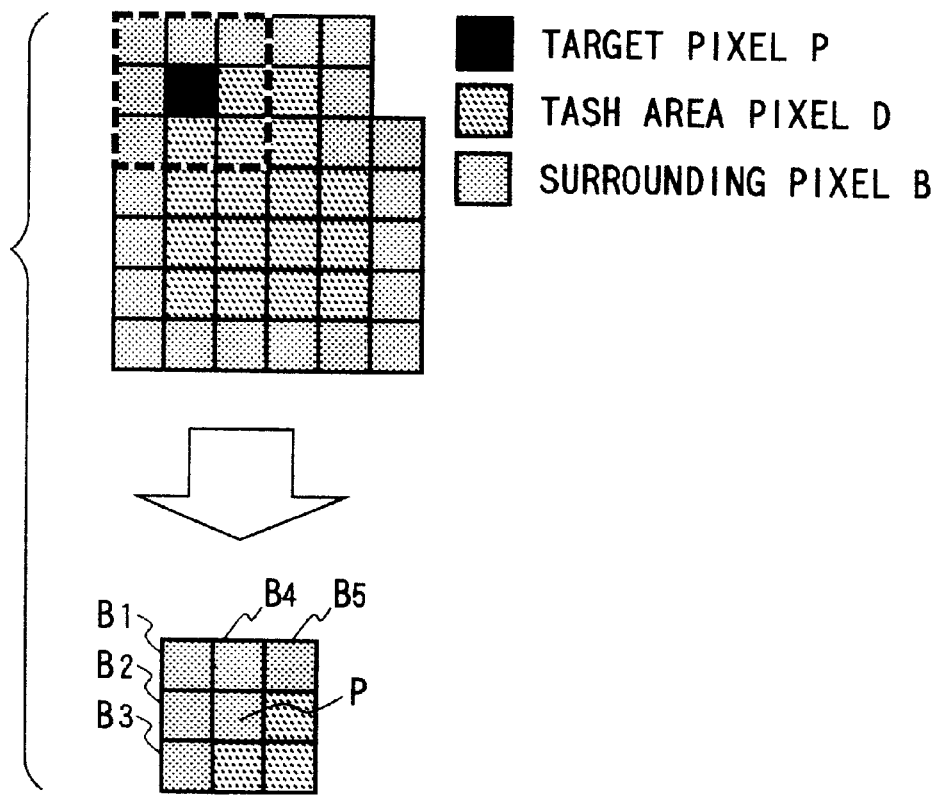
FIG. 11 is a view which illustrates the pixels that form a trash image and the circumferential pixels thereof.
FIG. 12 is a view which shows a matrix to be used for beginning the quadratic differential operation.

FIG. 11 illustrates the pixels that form a trash image, and the circumferential pixels thereof. Given the target pixel as P, and the circumferential pixel B, the circumferential pixels that can be used for correction are five pixels B1, B2, B3, B4, and B5 of the area of the eight pixels adjacent to the target pixel. After color image signals are decomposed into the hue component (H), the saturation component (S), and the lightness component (L), the average value of the saturation and lightness of the circumferential pixels B1 to B5 is calculated, respectively, so as to make it each value for the substitution of the saturation and lightness of the target pixel P. As to the hue, the average value and variance of the circumferential pixels B1 to B5 are calculated to create random digits following the regular distribution of such average value and variance, thus making them the value for the substitution of the hue of the target pixel P.

In this respect, the color space is not necessarily limited to the HLS for use of the interpolation described above. It may be possible to use other color space, such as L*a*b* or RGB.

FIG. 12 is a view which shows the matrix used for beginning the quadratic differential operation, that is, the Laplacian operators in the widely adopted form.

As described above, when trash images are detected for the present embodiment, it is possible to detect various kinds of them having different colors and shapes in high precision with the detection of various kinds of contours which present different behaviors in changing the pixel values in a digital image that contains the trash images.

Also, the operator determines the kinds of trash, white, black, string, or dot, for example, and based upon his determination, trash images are detected. In this manner, the accuracy of such detection is enhanced.

Also, it is possible to detect the string trash images accurately, besides the dotted trash images, by the addition of the evaluation factors of the shape thereof.

Also, when an image on a source document is inputted with the adhesion of trash, such trash often appears as a white trash image if the source document is a negative film. It often appears as a black trash image if the source document is a positive film. Therefore, the color of the objective trash image is initially set for white when the source document is a negative film, and for black when it is a positive film. In this manner, it becomes possible to save the task of the operator, while making it easier for him to dispose of the kind of the trash image that may often appear repeatedly on the inputted source document.

Also, if a plurality of trash images are corrected separately from the adjacent circumferential pixels, the pixel values may change abruptly on each of the boundary between them. Therefore, the resultant image tends to become unnatural. In accordance with the present embodiment, the adjacent trash images are joined together in order to correct them to a natural image.

Also, it is possible to select the method of interpolation depending on the kinds of images to be corrected.

Also, when the values of pixels that form a trash image are corrected by the application of the values calculated from the values of the circumferential pixels thereof, the lightness and saturation of the pixels that form the trash image are corrected by the application of the average value of the circumferential pixels, and the hue is corrected by use of the random digits following the regular distribution of the average value and variance of the circumferential pixels, among some others. Hence, depending on the kinds of parameters on color spaces, the method of correction may change. Therefore, it is made possible to correct the trash image and obtain a natural image.

Further, the size of trash image that may appear on the output image is estimated in accordance with the output destination of the image data. It is arranged not to remove the trash image whose size is less than the one that cannot be sensed visually by the eye sight, nor the trash image whose size is greater than the one that may result in an unnatural image if corrected. In this manner, while avoiding the creation of any unnatural images, the time required for corrections is made shorter.

Other Embodiments

The present invention may be applicable to a system structured by plural kinds of equipment (a host computer, an interface equipment, a reader, a printer, or the like, for example) or an apparatus structured by one equipment (a copying machine, a facsimile equipment or the like, for example).

Here, of course, it is possible to achieve the objectives of the present invention with the provision of a storage medium that holds the programming codes to perform the functions of the embodiments described above as a software, which is supplied to a system or an apparatus so that the computer (or the CPU or the MPU) of the system or the apparatus may read the programming codes stored on the storage medium for the execution thereof. In this case, the programming codes read from the storage medium themselves can be the constituent that materializes the functions of the embodiments described above. It is to be understood, therefore, that the storage medium that holds such programming codes constitutes the present invention. As the storage medium that supplies the programming codes, there are usable a floppy disk, a hard disk, an optical disk, a magneto-optic disk, a CD-ROM, a CD-R, a magnetic tape, a nonvolatile memory card, a ROM, or the like.

Here, not only by the execution of the programming codes that a computer reads out, the functions of the embodiments can be materialized, but also, by the total or partial execution of the actual processes by means of an OS (operating system) working on a computer, the functions of the embodiments can be materialized. Here, it is to be understood, therefore, that the present invention also includes such execution of the functions of the embodiments described above.

Further, after the programming codes are read from a storage medium and inputted into the extended functional card provided for a computer or inputted into the memory provided for the extended functional unit connected with a computer, the CPU or the like that may operate based upon such extended functional card or extended functional unit carries out the actual processes totally or partially. Then, the functions of the embodiments described above are materialized by means of such processes. Here, it is to be understood, therefore, that the present invention also includes such execution of the embodiments as described above.

Figure 13:
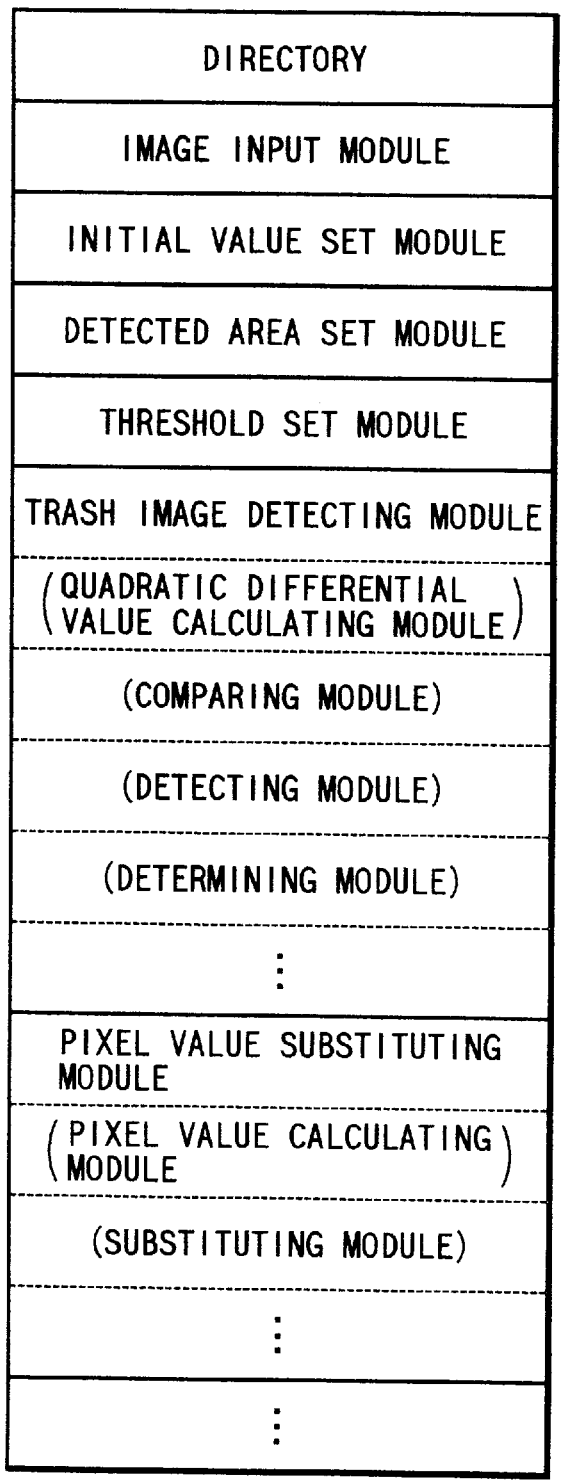
FIG. 13 is a view which shows the example of the memory map of a storage medium that stores the programming codes in accordance with the second embodiment of the present invention.

When the present invention is applied to any of the storage media mentioned above, the programming codes are stored corresponding to the flowcharts described above. To describe this case briefly, each of the modules is stored in any one of such storage media as indicated in the example of memory map shown in FIG. 13. In other words, the programming codes stored in it may be arranged to execute each of the modules of "threshold value setting", "operation of quadratic differential value", "comparison", and "detection", among some others.

Here, as described above, it is possible to provide an image processing apparatus capable of detecting trash images from image data in good precision, and to provide the method therefor as well in accordance with the present invention.

Further, it is possible to provide an image processing apparatus capable of removing trash images while suppressing the deterioration of image quality, and to provide the method therefor as well.

What is claimed is:

1. An image processing method comprising the steps of:
    setting a threshold value in accordance with the properties of an objective trash image to be detected;
    calculating the quadratic differential value of the pixel value of inputted image data;
    comparing said quadratic differential value and said threshold value; and
    detecting the trash image candidate contained in said inputted image data in accordance with the result of said comparison.

2. An image processing method according to claim 1, wherein the pixels having said quadratic differential value being larger than the positive threshold value, and the pixels having said quadratic differential value being smaller than the negative threshold value are detected in said detection step as pixels to constitute said trash image candidate.

3. An image processing method according to claim 1, wherein when the object of detection is a black trash image, the pixels having said quadratic differential value being larger than the positive threshold value are assumed to be the pixels constituting the inner contours of said trash image candidate in said detection step, and on the outer side of said inner contours, the pixels adjacent to the pixels constituting said inner contours are assumed to be the pixels constituting the outer contours of said trash image candidate at the same time.

4. An image processing method according to claim 3, wherein with respect to the pixels constituting said outer contours, if the ratio of pixels having the quadratic differential value being smaller than the negative threshold value is smaller than a specific ratio, the image represented by said outer contours is determined not to be any thresh image in said detection step,
    said specific ratio being set in accordance with the properties of said black trash image in said setting step.

5. An image processing method according to claim 1, wherein when the object of detection is a white trash image, the pixels having said quadratic differential value being smaller than the negative threshold value are assumed to be the pixels constituting the inner contours of said trash image candidate in said detection step, and on the outer side of said inner contours, the pixels adjacent to the pixels constituting said inner contours are assumed to be the pixels constituting the outer contours of said trash image candidate at the same time.

6. An image processing method according to claim 5, wherein with respect to the pixels constituting said outer contours, if the ratio of pixels having the quadratic differential value being larger than the positive threshold value is smaller than a specific ratio, the image represented by said outer contours is determined not to be any trash image in said detection step,
    said specific ratio being set in accordance with the properties of said white trash image in said setting step.

7. An image processing method according to claim 3, wherein trash image candidates having said outer contours adjacent to each other are joined together as one trash image candidate in said detection step.

8. An image processing method according to claim 3, wherein when said object of detection is a string trash image, said trash image candidate is evaluated in accordance with the ratio between the image area of said trash image candidate and the square of the length of said outer contours is said detection step.

9. An image processing method according to claim 1, wherein the value of pixels constituting said trash image is corrected in accordance with the value of the circumferential pixels thereof in said detection step.

10. An image processing method according to claim 9, wherein a first correction value uniformly obtainable from said circumferential pixels, and a second correction value having variation based upon the value of said circumferential pixels are selectively used in said correction step.

11. An image processing method according to claim 10, wherein said first correction value is used for correcting the saturation lightness of pixels, and the second correction value is used for correcting the hue of pixels in said correction step.

12. An image processing method according to claim 9, wherein the size of trash image appearing on the output image is estimated in accordance with the output destination of said inputted image data in said correction step, and whether or not said correction is executable is determined in accordance with the result of said estimate.

13. An image processing apparatus comprising:
   setting means for setting a threshold value in accordance with the properties of an objective trash image to be detected;
   calculating means for calculating the quadratic differential value of the pixel value of inputted image data;
   comparing means for comparing said quadratic differential value and said threshold value; and
   detecting means for detecting retrival candidate contained in said inputted image data in accordance with the result of said comparison.

14. An image processing apparatus according to claim 13, further comprising:
   correcting means for correcting the value of pixels constituting said trash image in accordance with the value of the circumferential pixels thereof.

15. A memory readable by a computer storing programming codes for image processing, comprising:
   codes of the step for setting a threshold value in accordance with the properties of an objective trash image to be detected;
   codes of the step for calculating the quadratic differential value of the pixel value of inputted image data;
   codes of the step for comparing said quadratic differential value and said threshold value; and
   codes of the step for detecting the trash image candidate contained in said inputted image data in accordance with the result of said comparison.

* * * * *

UNITED STATES PATENT AND TRADEMARK OFFICE
CERTIFICATE OF CORRECTION

PATENT NO.   :   6,125,213

DATED        :   September 26, 2000

INVENTOR(S) :   YASUSHI MORIMOTO

It is certified that error appears in the above-identified patent and that said Letters Patent is hereby corrected as shown below:

IN THE DRAWINGS

Sheet 14, Figure 11, "TASH" should read --TRASH--;

Col. 1, line 58, "advantage" should read --advantages--;

Col. 3, line 3, "apparatuss," should read --apparatus--;
        line 42, "L*a*b*L* should read --L*a*b*--;
        line 45, "Now, should read --Then,--;

Col. 5, line 16, "is" should read --are--;

Col. 6, line 41, "oridinal" should read --original--;
        line 62, "As" should read --¶As--;

Col. 7, line 4, "to" should read --to as--;

Col. 10, line 14, "S729" should read --step S729--;

Col. 11, line 34, "sensed" should read --can be sensed--;
         line 35, "eye sight" should read --eyesight--;

UNITED STATES PATENT AND TRADEMARK OFFICE
CERTIFICATE OF CORRECTION

PATENT NO.     :  6,12,213

DATED          :  September 26, 2000

INVENTOR(S)    :  YASUSHI MORIMOTO

It is certified that error appears in the above-identified patent and that said Letters Patent is hereby corrected as shown below:

Col. 12, line 46, "boundary" should read --boundaries--;

Col. 13, line 2, "eye sight," should read --eyesight,--;

Col. 14, line 32, "thresh" should read --trash--;
         line 67, "is" should read --in--.

Signed and Sealed this

Twenty-second Day of May, 2001

Attest:

NICHOLAS P. GODICI

Attesting Officer    Acting Director of the United States Patent and Trademark Office